United States Patent
Jorgenson

(10) Patent No.: US 6,813,635 B1
(45) Date of Patent: Nov. 2, 2004

(54) SYSTEM AND METHOD FOR DISTRIBUTING LOAD AMONG REDUNDANT INDEPENDENT STATEFUL WORLD WIDE WEB SERVER SITES

(75) Inventor: Daniel Scott Jorgenson, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 734 days.

(21) Appl. No.: 09/687,779

(22) Filed: Oct. 13, 2000

(51) Int. Cl.[7] ................................................ G06F 13/00
(52) U.S. Cl. ...................... 709/225; 709/219; 709/226; 709/227
(58) Field of Search ................................ 709/203, 217, 709/219, 223, 224, 225, 226, 227, 229; 718/104, 105

(56) References Cited

U.S. PATENT DOCUMENTS

| | | | | |
|---|---|---|---|---|
| 5,938,732 A | * | 8/1999 | Lim et al. .................... | 709/229 |
| 6,070,191 A | * | 5/2000 | Narendran et al. ......... | 709/226 |
| 6,249,801 B1 | * | 6/2001 | Zisapel et al. .............. | 718/105 |
| 6,330,602 B1 | * | 12/2001 | Law et al. .................. | 709/224 |
| 6,332,158 B1 | * | 12/2001 | Risley et al. ............... | 709/219 |
| 6,381,627 B1 | * | 4/2002 | Kwan et al. ................ | 709/201 |
| 6,484,143 B1 | * | 11/2002 | Swildens et al. .............. | 705/1 |
| 6,578,066 B1 | * | 6/2003 | Logan et al. ............... | 718/105 |

* cited by examiner

Primary Examiner—Viet D. Vu

(57) ABSTRACT

The present invention provides a system and method for distributing load among redundant, independent, stateful web server sites that overcome the limitations of prior art solutions. This is accomplished by constructing the server computer to respond to an initial connection request from a client computer with the name of a server computer site, pool or group selected based on various criteria. The server computer site, pool and group names are maintained in DNS nameservers with load balancing and failover capabilities. As a result, the single-point-of-failure and performance issues introduced by prior art web proxy servers are eliminated. In addition, since the session state information is only maintained on the selected server computer site, the need to synchronize web proxy server state with server computer state is eliminated.

12 Claims, 8 Drawing Sheets

US 6,813,635 B1

SYSTEM AND METHOD FOR DISTRIBUTING LOAD AMONG REDUNDANT INDEPENDENT STATEFUL WORLD WIDE WEB SERVER SITES

BACKGROUND OF THE INVENTION

1. Field of the Invention

The present invention relates generally to World Wide Web servers and, more particularly, to techniques for distributing load among World Wide Web servers.

2. Related Art

Current World Wide Web servers ("web servers") are accessed by client computers using the Hypertext Transfer Protocol (HTTP) or its encrypted form (HTTPS). A typical interaction between the client computer and a web server consists of several HTTP and/or HTTPS requests. For example, when a user of the client computer first accesses a web site, an HTTP connection request is sent to a web server maintaining the web site. The HTTP request contains a Uniform Resource Identifier (URI) which specifies the web page being requested. The web server, in turn, responds to the HTTP request by downloading the requested web page (e.g., a Hypertext Markup Language (HTML) file) to the client computer. The HTML file is then interpreted by a web browser executed by the client computer and displayed to the user. If the user selects a hyperlink on the web page, a new HTTP/HTTPS request is sent to the web server, which may result in a new web page being downloaded to the client computer.

In addition, the Domain Name System (DNS) protocol is used to translate user-friendly server computer names (e.g., hp.com) into Internet Protocol (IP) addresses (e.g., 191.24.0.2). When the user of a client computer first selects a hyperlink for a web server whose IP address is not already known by the client computer, the client computer uses DNS to obtain the IP address for the web server from a DNS server. Subsequently, the client computer is then able to initiate the HTTP/HTTPS transaction with the web server. DNS servers typically maintain tables mapping names to IP addresses. Included with this mapping is a Time To Live (TTL) value, representing the number of seconds for which a client computer may confidently retain the IP address for a given name once the IP address has been returned through DNS. When a DNS server contains a mapping for a given name, the DNS server is said to be "authoritative" for that name.

In some cases, DNS servers are arranged in a hierarchical fashion (i.e., one DNS server may transfer a DNS name resolution request for a specific name to another DNS server). In these cases, such DNS servers typically do not only contain authoritative mappings, but also temporary, non-authoritative mappings obtained previously via recursion into the DNS hierarchy. These non-authoritative mappings are only retained by the DNS server for such time as permitted by the TTL values.

Since the HTTP/HTTPS protocols are inherently stateless (namely, an HTTP/HTTPS request intrinsically contains no information about the outcome of a prior request), a web server communicating with a client computer cannot rely on these protocols for maintaining state (i.e., storing information about the stage of processing of the client computer's overall interaction with the server). The series of discrete HTTP/HTTPS transactions over which state is maintained is typically referred to as a "session." As the amount of state data to be maintained increases, or sensitive information is included among it, techniques for exchanging the state data explicitly across HTTP/HTTPS become unsuitable and the state data must be maintained locally on the web server or some other computer (e.g., a database server) to which the web server has direct access. Instead of transferring a large amount of sensitive state data, a small token uniquely referencing the state data is exchanged by the client and server across HTTP/HTTPS, while the state data itself is kept on the server. This general architecture is referred to as "server-resident state," and the reference token as a "session ID." Server computers in this architecture are thus referred to as "stateful."

Server-resident state is typically not a problem when client computers interact with a single server computer. Due to the number of requests received by server computers, however, typically a pool of server computers is used rather than a single server computer. These stateful server computers are referred to as "redundant" in that they are all capable of being used to initiate a session with a client computer. In such a situation, the client computer would ordinarily connect to different server computers in the pool on successive connection requests during a session. This would require sharing the state information for each client among all servers in the pool. This is feasible when the repository for the server-resident state is a shared database or similar resource, or when state data is replicated across multiple repositories. But when the redundant, stateful server computers are remotely located from one another, or the state data is large, or performance considerations outweigh their use, such techniques for sharing server-resident state amongst all of the servers become impractical. That is, in some of these cases, it is impractical for any of the servers in the pool to share state. In other cases, some of the servers in the pool may share state amongst themselves, but not with the others. In any case, each unit of one (or more) redundant, stateful server computers sharing state amongst themselves, but not with other such units in the pool, is referred to as a "site." Furthermore, the redundant, stateful server computer sites are referred to as "independent" because state data is not being shared among them.

Thus, for a pool of multiple stateful web server sites which are redundant of one another, yet which maintain state independently of one another, the problem arises of distributing sessions across the pool when they are initiated, while maintaining affinity between a particular client computer and server computer site for the duration of a session. The problem is compounded when provision for failure of a server computer site must be made.

A device such as a web proxy may be used to ensure that each client computer always connects to the same redundant, independent, stateful server computer site during a session. Such a system is illustrated by FIGS. 1A–1B. In FIG. 1A, a client computer 110 is connected to a pool of server computer sites 120n (where n=A, B, . . . ) and a web proxy server 140 over a computer-network 130. As illustrated in FIG. 1B, client computer 110 first sends an HTTP/HTTPS connection request to web proxy server 140. DNS server 150 translates the web proxy server name from the URI sent by client computer 110 into a corresponding IP address for web proxy server 140 (IPP). Web proxy server 140, in turn, selects one of server computer sites 120n and sends the connection request along to the selected server computer site 120n. The selected server computer site 120n initiates a new session and responds by downloading the requested web page, including the new session ID, to client computer 110. Web proxy server 140, in turn, maintains a table mapping each client computer 110's session ID to the selected server computer site 120n. As a result, when a new connection request is received from client computer 110, web proxy server 140 is able to forward the request to the selected server computer site 120n using an IP address for a server computer site (e.g., IPA or IPB).

This approach, however, presents several limitations. First, since every connection request is sent to web proxy server 140, web proxy server 140 progressively becomes a performance bottleneck as the number of server computer sites 120n in the pool increases. Similarly, web proxy server 140 creates a single-point of failure for communications directed to the entire pool of server computer sites 120n.

Finally, session state must be synchronized between web proxy server 140 and the selected server computer site 120n. That is, the web proxy server 140 must recognize when the session of the client computer 110 with the server pool first begins, so that a mapping to the selected server computer site 120n may be added to the table. Similarly, Web Proxy server 140 must recognize when the session has ended or expired, so that the mapping may be removed. Heuristic techniques are typically used to perform session ID recognition. These heuristics, however, are often inadequate for web applications where the session ID changes during a single session, is not removed at the end or expiration of the session, or cannot be recognized due to encrypted transport within HTTPS.

There is thus a need for an improved system for distributing load among web servers.

SUMMARY OF THE INVENTION

The present invention provides a system and method for distributing load among redundant, independent, stateful web server sites that overcome the limitations of prior art solutions. This is accomplished by programming the server computer to respond to an initial connection request from a client computer with the name of a server computer site, pool or group selected based on various criteria. The server computer site, pool and group names are maintained in DNS nameservers with load balancing and failover capabilities. As a result, the single-point-of-failure and performance issues introduced by prior art web proxy servers are eliminated. In addition, since the session state information is only maintained on the selected server computer site, the need to synchronize web proxy server state with server computer state is eliminated.

DETAILED DESCRIPTION OF THE INVENTION

Figure 1A:
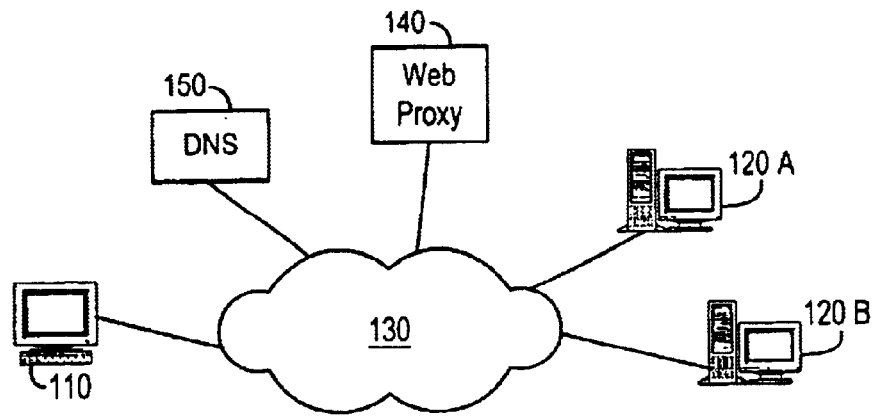
FIG. 1A is a block diagram of a prior art computer system for distributing load among a plurality of web servers.
Figure 1B:
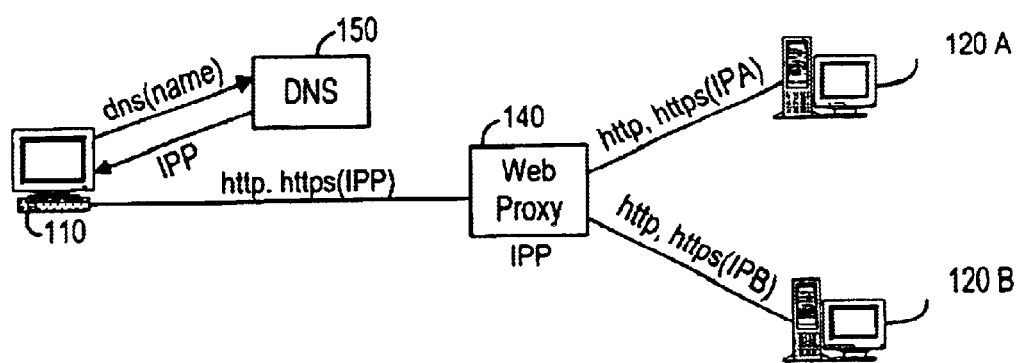
FIG. 1B is a block diagram illustrating the connections established among the client computer, server computer sites and the web proxy server of FIG. 1A.
Figure 2A:
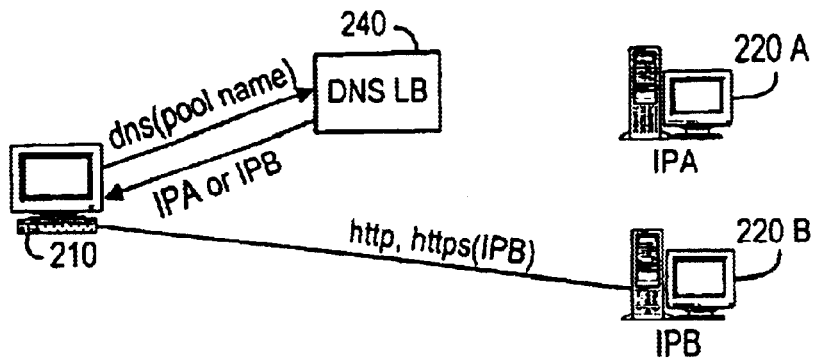
FIGS. 2A–2C are block diagrams illustrating the connection established among the client computer, the server computer sites and the DNS servers of an improved computer system for distributing load among a plurality of web servers, in accordance to some embodiments of the invention.
Figure 2B:
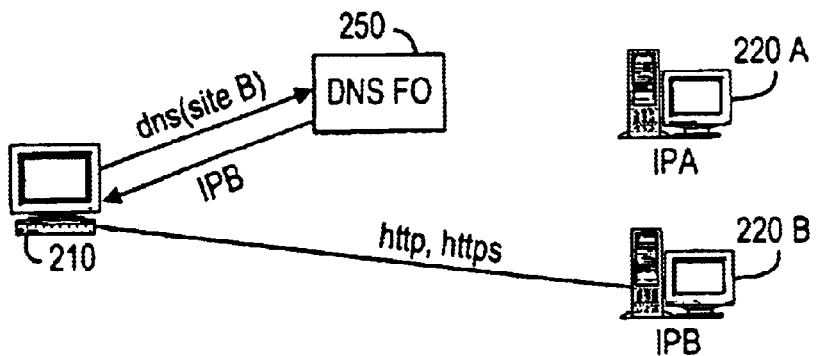
Figure 2C:
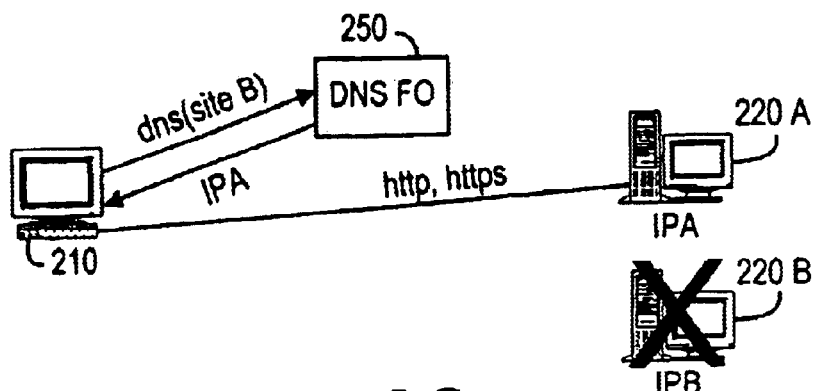
Figure 4A:
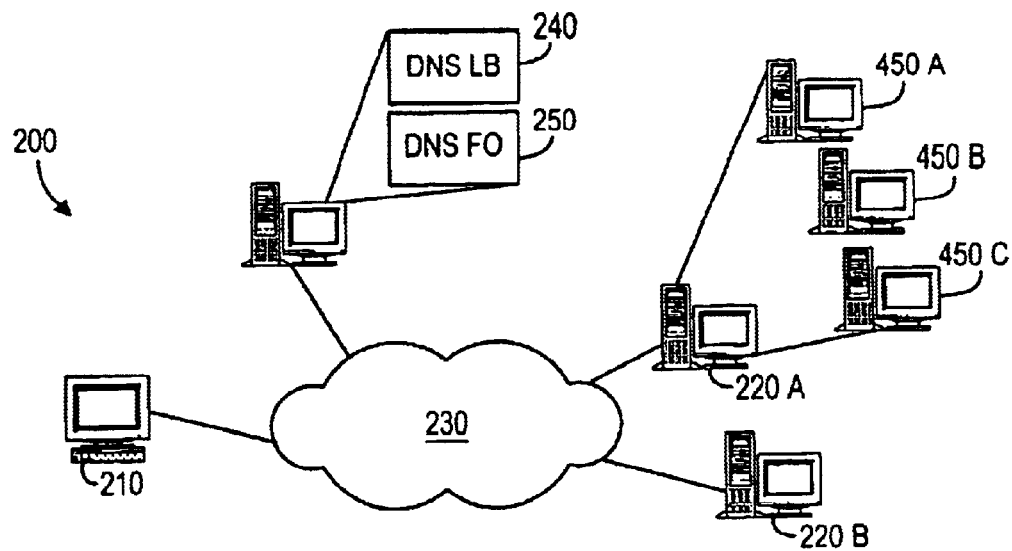
FIGS. 4A and 4B are a block diagram illustrating exemplary configurations of the computer system of FIGS. 2A–2C.
Figure 4B:
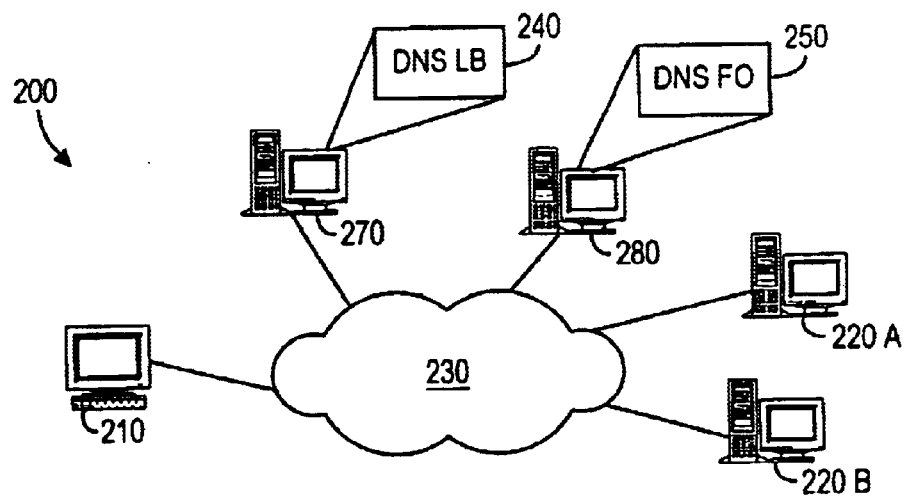

FIGS. 2A–2C illustrate a computer system 200 for distributing load among a plurality of stateful, independent, redundant web server sites, in accordance to some embodiments of the invention. The computer system 200 includes a client computer 210, a plurality of server computer sites 220n (where n=A, B, . . . ), a DNS Load Balance (LB) server 240 and a DNS Failover (FO) server 250 connected over a computer network 230 (FIGS. 4A and 4B).

The DNS Load Balance server 240 is initially configured to be authoritative for a Pool Name identifying the entire pool of server computer sites 220n (FIG. 2A). A very low, or zero, TTL is configured for use with the Pool Name. When the DNS LB server 240 receives a DNS resolution request for the Pool Name, the DNS LB server 240, in turn, selects one of the server computer sites 220n based on the respective statuses of all server computers 220n in the pool. Various status calculation techniques known in the art can be used to select the server computer site. For example, status calculation could take into account current site availability and/or load. As a result, the invention is not limited to the use of any particular status calculation technique. The DNS LB server 240 then returns an IP address for the selected server computer site to client computer 210. Client computer 210, in turn, establishes an HTTP/HTTPS connection with the selected server computer site 220n (e.g., server computer site 220B).

Requests from client computer 210 to initiate a stateful session are made using server computer site 220n's Pool Name. In contrast, successive connection requests from client computer 210 during a session are made using the selected server computer site 220n's (e.g., 220B) Site Name, rather than the Pool Name (FIG. 2B). The DNS Failover server 250 is initially configured to be authoritative for each server computer site 220n's Site Name. Again, a very low, or zero, TTL is configured for use with each Site Name. The DNS FO server 250 receives a DNS request from client computer 210 and translates the Site Name for server computer site 220B into an IP address for server computer site 220B (IPB), if server computer site 220B is operational. Client computer 210 then establishes an HTTP/HTTPS connection with server computer site 220B using IP address IPB. However, if server computer site 220B is no longer available (FIG. 2C), DNS FO server 250 responds to the DNS request with an IP address for another server computer site 220n in the pool (e.g., IPA). In such case, client computer 210 then establishes an HTTP/HTTPS connection with server computer site 220A.

As a result, the need for a web proxy server is eliminated. Furthermore, the failure of any server computers site 220n in the pool can be handled seamlessly by computer system 200, by simply redirecting connection requests to another server computer site in the pool.

Figure 3A:
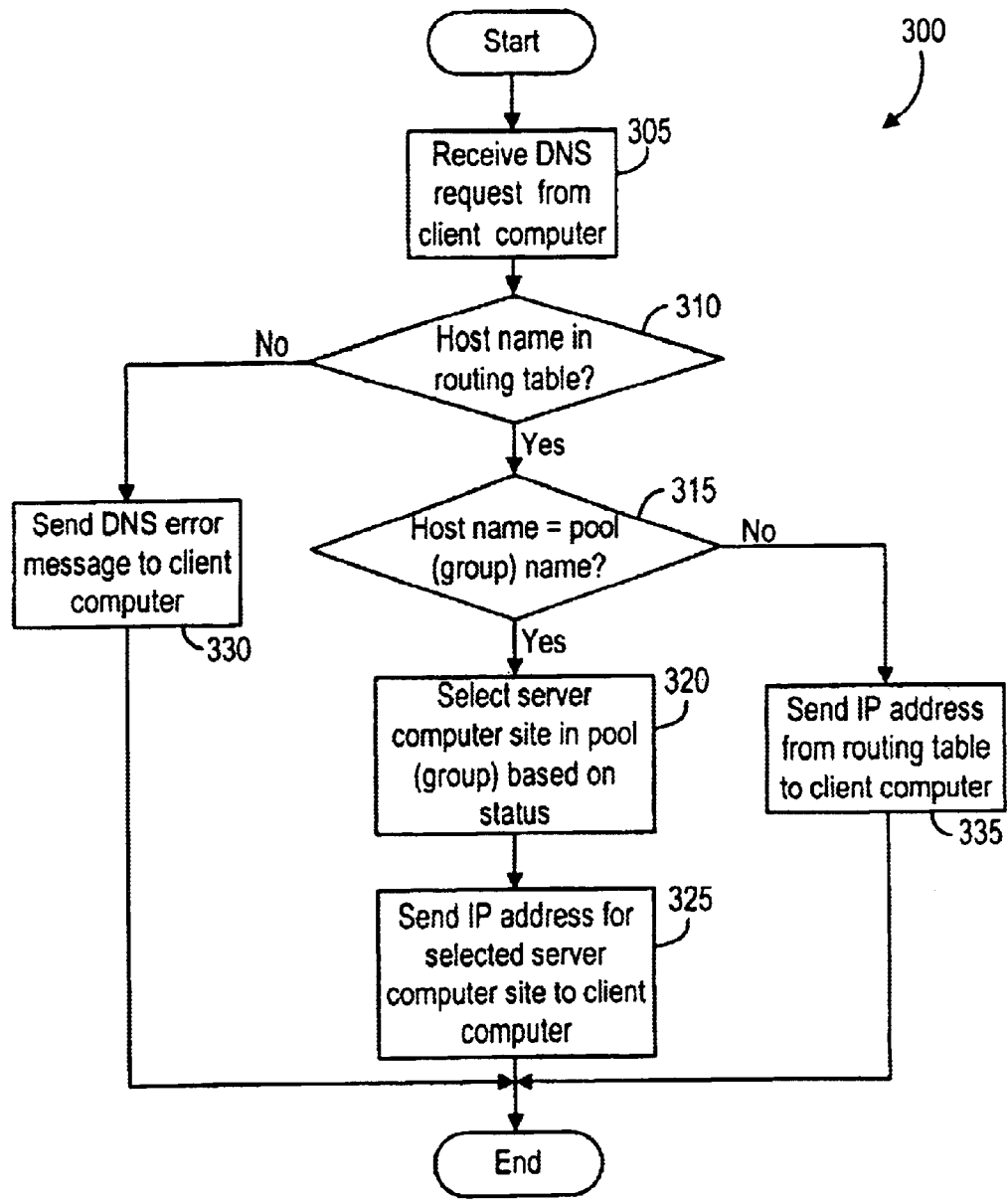
FIGS. 3A and 3B are a flow diagram of the operation of the computer system of FIGS. 2A and 2B.

FIG. 3A is a flow diagram of the operation 300 of DNS LB 240 (FIG. 2A). A DNS request is received from client computer 210 (stage 305). Stage 310 then determines whether the host name specified in the DNS request matches an entry in the routing table of DNS LB 240, in which case operation 300 proceeds to stage 315. Otherwise, operation 300 proceeds to stage 330. Stage 315, in turn, determines whether the host name specified in the DNS request corresponds to the pool of server computer sites 220n, in which case operation 300 proceeds to stage 320. Otherwise, operation 300 proceeds to stage 335. A server computer site 220n is then selected based on the relative statuses of server computer sites 220n (stage 320). An IP address for the selected server computer site 220n is then sent to client computer 210 (stage 325) and operation 300 terminates. Alternatively, a DNS error is generated (stage 330) and operation 300 terminates. In some embodiments, if the host name is not in the routing table, but the routing table points to additional DNS servers, the additional DNS servers are queried (a "recursive query") or the DNS server's name is returned to the client computer so the client computer can decide whether to query the returned DNS server (a "non-recursive query").

Figure 3B:
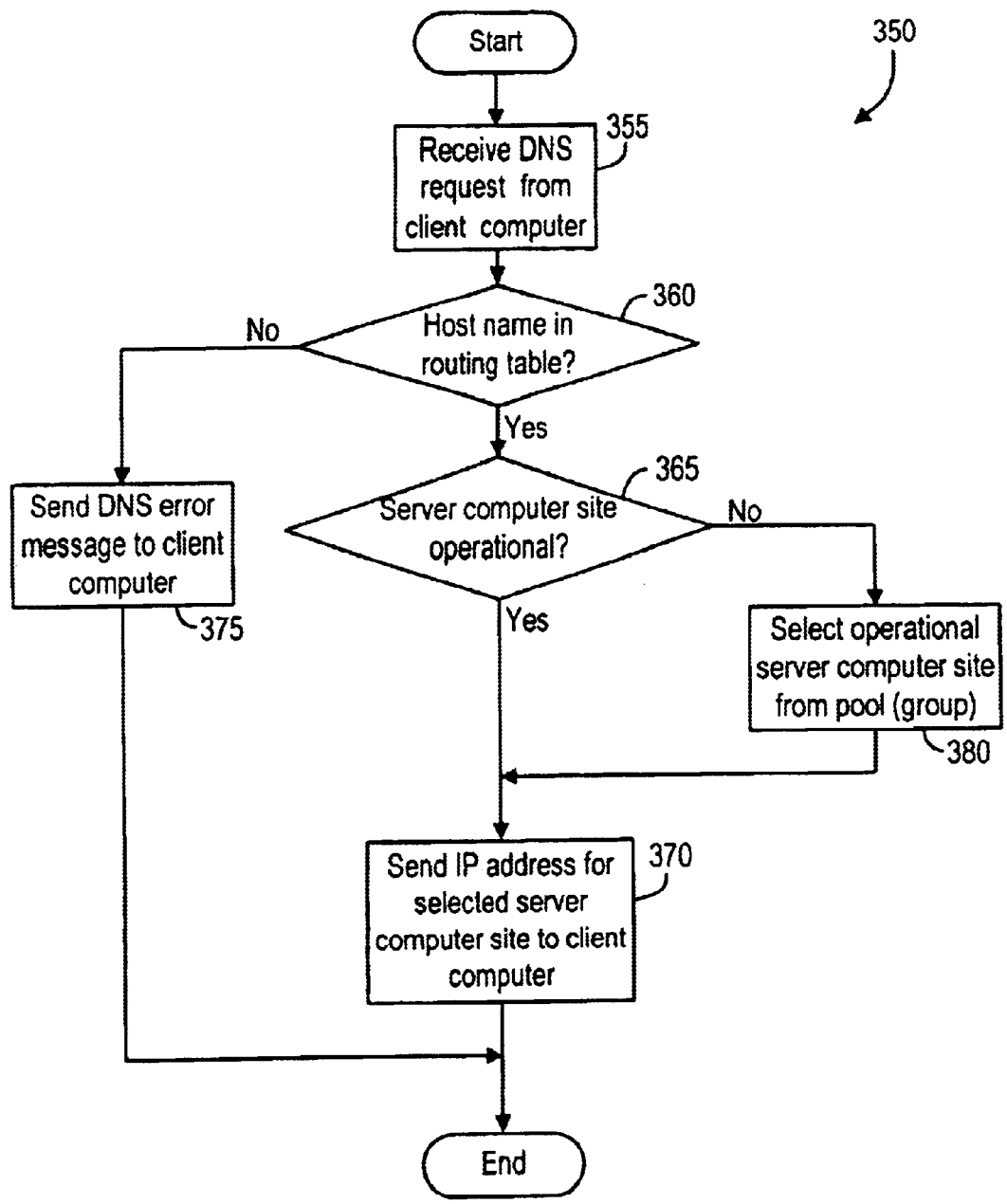

FIG. 3B is a flow diagram of operation 350 of DNS FO 250 (FIGS. 2B and 2C). A DNS request is received from client computer 210 (stage 355). Stage 360 then determines whether the host name specified in the DNS request matches an entry in the routing table of DNS FF 250, in which case operation 350 proceeds to stage 365. Otherwise, operation 350 proceeds to stage 375. Stage 365, in turn, determines whether the server computer site 220n corresponding to the host name specified in the DNS request is operational, in which case operation 350 proceeds to stage 370. Otherwise, operation 350 proceeds to stage 380. An operational server computer site 220n is then selected based on the relative statuses of server computers site 220n (stage 380). An IP address for the selected server computer site 220n is then sent to client computer 210 (stage 370) and operation 350 terminates. Alternatively, a DNS error is generated (stage 375) and operation 350 terminates. As explained above, in some embodiments, further DNS queries (recursive or non-recursive) may be attempted rather than generating the DNS error.

FIGS. 4A and 4B illustrate exemplary configurations of computer system 200 (FIGS. 2A–2C). In both configurations, client computer 210 and server computer sites 220n are connected to a computer network 230. In the configuration of FIG. 4A, however, DNS LB server 240 and DNS FO server 250 are executed by a single server 260. By contrast, in the configuration of FIG. 4B, DNS LB 240 is executed by server 270, while DNS FO 250 is executed by a separate server 280. Several off-the-shelf products can be used to implement DNS LB server 240 and/or DNS FO server 250. In some embodiments of the invention, DNS LB server 240 and DNS FO server 250 are implemented using the DistributedDirector 2500 series, available from Cisco Systems, Inc., of San Jose, Calif. In other embodiments, DNS platforms other than Cisco's DistributedDirector may be used. Accordingly, the invention is not limited to any particular DNS platform.

In some embodiments, each server computer site 220n may in turn comprise multiple server computers 450n, as shown in FIG. 4A with respect to server computer site 220A, where server computers 450n share session state amongst themselves.

Figure 4C:
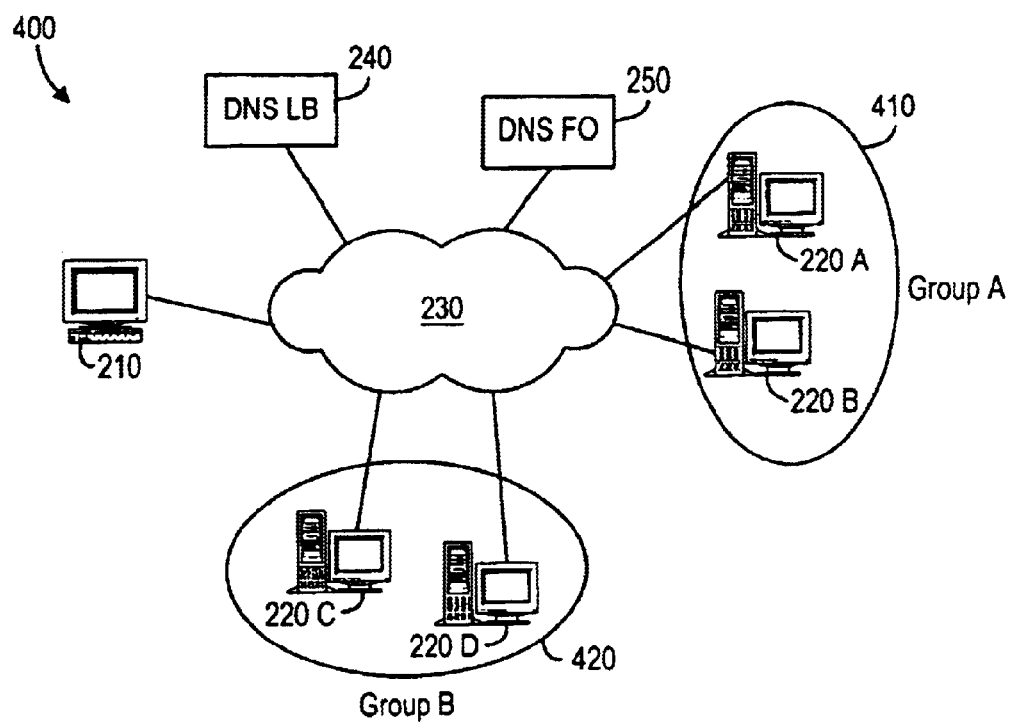
FIG. 4C is a block diagram of an exemplary configuration of a grouped computer system, in accordance with some embodiments of the invention.

FIG. 4C illustrates a grouped computer system 400 for distributing load among a plurality of stateful, independent, redundant web servers, in accordance to some embodiments of the invention. Computer system 400 is analogous to computer system 200 (FIGS. 2A–2C) except that server computer sites 220n are subdivided in two or more groups (e.g., groups 410 and 420). Server computer sites 220n can be grouped using a variety of criteria (e.g., geographic location, organizational structure, load capacity). For example, an organization supporting users in different continents (e.g., Europe, Asia and the Americas) may want to group server computer sites 220n according to geographic location, with each group serving users in a specific geographic area. In such embodiments, a new Group Name entry is added authoritatively to the DNS table of DNS LB server 240 for each group of server sites 220n, such that each Group Name identifies a respective group of server sites 220n. Again, a very low, or zero, TTL is used with each Group Name. When a DNS request is received with a Group Name, a server computer site 220n in the appropriate group is selected and an IP address for the selected server computer site 220n is returned to client computer 210. The IP address of the selected server computer site 220n is then returned by DNS FO server 250 in response to subsequent DNS requests with the Site Name of the selected server computer site 220n, as long as the selected server computer site 220n remains operational. In some embodiments, when a client computer 210 connects to a server computer site 220n in a specific group, a cookie or other flag is stored on client computer 210 to indicate which group of server computer sites 220n is associated with that client computer 210.

Each server computer site 220n, in turn, responds to initial requests directed to a Pool Name by redirecting those requests back to the same server computer site 220n using the Site Name for that site. In this way, the client computer 210 may initially use the Pool Name to enter into a session on an available server computer site 220n, then be instructed by the server computer to use the Site Name for that computer site henceforth for the remainder of the session. Similarly, as shown in FIG. 4C, each server computer site 220n responds to initial requests directed to a Pool Name or Group Name, by redirecting those requests back to the Site Name for that site, or Group Name for an alternate group, depending on whether the request came into the proper group or not.

In addition, server computer sites 220n respond to initial requests directed to a Site Name by redirecting those requests back to the Pool Name (in FIGS. 4A and 4B) or Group Name (in FIG. 4C). This is to address the scenario in which a client computer 210 may request to initiate a new session using a Site Name rather than a Pool or Group Name (e.g., by a user memorizing or bookmarking a Site Name used in a previous session). As the number of such requests increases, the efficacy of the load distribution process may be compromised, since such requests may not be accounted for by the DNS LB server 240. To prevent this phenomenon, each server computer site 220n verifies that any connection requests have run through the DNS LB server 240 and redirects requests to initiate a session made directly to the Site Name, directing them to the Pool or Group Name instead.

Figure 5A:
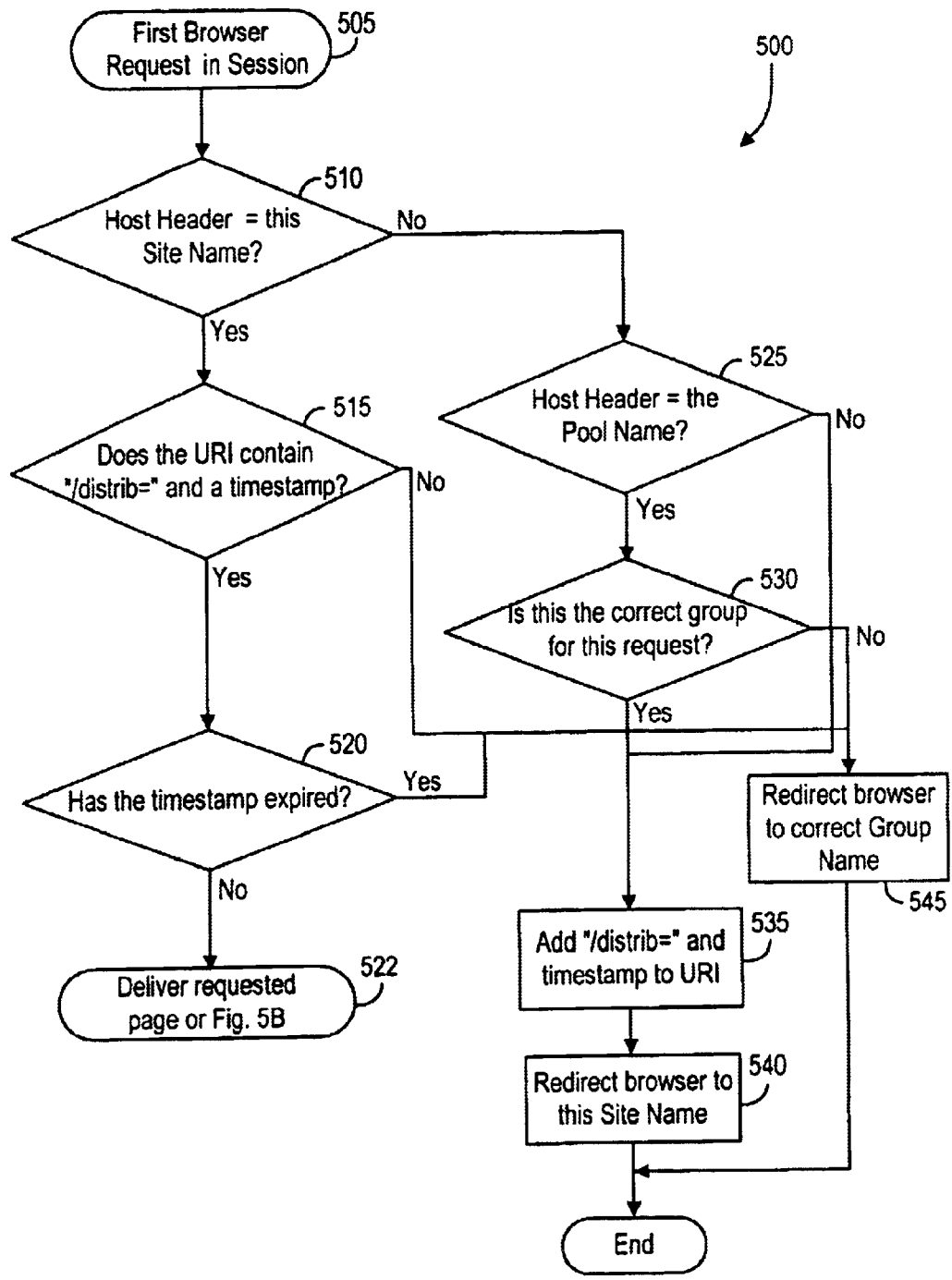
FIGS. 5A and 5B are flow diagrams of the operation of the grouped computer system of FIGS. 4A–4C.

FIG. 5A is a flow diagram of operation 500 of all server computers at all server computer sites 220n to perform the server computer functions described above. Operation 500 is performed by server computers at server computer sites 220n to handle requests which do not correspond to existing, active session state (e.g., the request lacks a valid session ID or contains an expired one). Conversely, requests which do correspond to existing, active session state are handled immediately, as they normally would be by a web server, bypassing operation 500 completely.

Initially, an HTTP or HTTPS request is received by a server computer at a server computer site 220n from a browser program executed by a client computer 210 (stage 505). The HTTP/HTTPS request is directed to the particular server computer at site 220n using a corresponding Site Name (via name resolution performed by DNS FO server 250). Alternately, a request specifying a Pool or Group Name could have been directed to the server computer at site 220*n* by the load-balancing process (via name resolution performed by DNS LB server 240). In either case, according to the HTTP/1.1 specification (RFC 2616), the HTTP/HTTPS request contains a Host header, whose value represents a name (Pool Name, Group Name, or Site Name) to which the request was directed.

Stage 510 then determines whether the Host header specified by the browser request is the Site Name of this server computer site 220*n*, in which case operation 500 proceeds to stage 515. Otherwise, operation 500 proceeds to stage 525. Because the Host header indicates in this case that the client computer 210 is not currently using the Site Name to access the server computer site 220*n*, but is using one of the load-balancing Pool or Group Names, or is using the Site Name of another server computer site which has failed-over to this one, all flow subsequent to this stage is aimed at redirecting the client computer 210 to a proper name.

Namely, if the request contains the Group Name for the server computer site 220*n*, or the request contains the Site Name for some other server computer site 220*n* which has failed-over to this one, or the request contains the Pool Name and this server computer site 220*n* is in the proper server group for handling the request, then the client computer 210 is redirected to the Site Name for this particular server computer site 220*n*. This redirection effectively switches the client over from using a Pool Name, a Group Name, or a Site Name for another server computer site 220*n* to using the Site Name for this particular server computer site 220*n*. This switchover binds the client computer 210 to the particular server computer site 220*n* for the duration of the session, or until the server computer site 220*n* fails. In such case, the DNS FO server authoritative for the Site Name redirects the client computer 210 to a different server computer site 220*n* in the same server group. When a server computer at that server computer site 220*n* executes operation 500, the Host header contains the Site Name for the original server computer site 220*n*, and the above logic repeats. Without this switchover from a Pool Name, a Group Name, or a Site Name for another server computer site 220*n*, to the Site Name for this server computer site 220*n*, the DNS LB or FO servers might arbitrarily connect client computer 210 to a different server computer site 220*n* (which would not store the necessary state data) when a subsequent HTTP/HTTPS transaction is performed.

Conversely, if the request is received by an inappropriate server computer group using the load-balancing Pool Name, client computer 210 is redirected to the proper Group Name for handling the request. Various criteria may be used for defining server groups, such as geographic location, organizational structure, or load capacity. Information present in the HTTP/HTTPS request can then be used to select the proper group for handling the request. For example, the Site Name for client computer 210 can be used to identify European clients and assign them to a European server group, Americas clients to an Americas group, and Asian clients to an Asian group. Actual criteria used may vary from one embodiment to another, and the invention should not be considered limited to use of only particular criteria. In fact, some embodiments of the invention dispense with server groups altogether: if no server groups are defined, then there simply are no Group Names configured in the DNS LB server, the Pool Name is used as the Group Name instead, and determinations of whether the particular server computer site 220*n* is of the proper group for handling the request are always affirmative.

Specifically, the above operations are shown in FIG. 5A beginning with stage 525, where the Host header is compared to the Pool Name for server computer site 220*n*. If they are the same, then operation 500 proceeds to stage 530. Otherwise (for example, the Host header is a Group Name or a Site Name of another server computer site 220*n* which has failed-over to this one), operation 500 proceeds to stage 535 and is committed to terminate with redirection to the Site Name. At stage 530, the correct server group for handling the request is determined, and compared to the server group in which the current server computer site 220*n* resides. If they are the same (or no groups are defined in the embodiment), then operation 500 proceeds to stage 535 and is committed to terminate with redirection to the Site Name. Otherwise, operation 500 proceeds to stage 545 and is committed to terminate with redirection to the proper Group Name (or Pool Name if no groups are defined in the embodiment).

At stage 535 operation 500 is committed to terminate with redirection to the Site Name for the current server computer site 220*n* at stage 540. The target location URI is the same as the current URI, although the server name is changed to be the Site Name. Additionally, a marker is added into the target location URI at stage 535 containing a timestamp. The marker may be added in any manner consistent with otherwise preserving the integrity of the original URI path and arguments when copied into the target location URI. For example, an embodiment may add the term "/distrib=", followed by the timestamp, to the additional path of the URI. In any event, the marker serves to date the URI so that it may expire, should the client computer 210 happen to repeat the request later (e.g., should the user happen to bookmark the target location URI and access the bookmark later).

Conversely, at stage 545 operation 500 is committed to terminate with redirection to the proper Group Name for handling the request. The target location URI is the same as the current URI, although the server name is changed to be the proper Group Name. In an embodiment in which groups are not implemented, the Pool Name is used rather than the Group Name.

In both stages 540 and 545, redirection is accomplished using such standard techniques as the HTTP/1.0 3xx protocol with the Location response header, or the HTML 2.0 META tag with the Refresh option. The invention is not limited to any particular mechanism for redirection of HTTP or HTTPS.

Operation 500 proceeds to stage 515 if the Host header already is the Site Name for the server computer site 220*n*. For example, when client computer 210 is redirected in stage 540 to reconnect to the same server computer site 220*n* using the Site Name for that site computer, the subsequent HTTP/HTTPS request is received by that server computer site 220*n* and operation 500 proceeds to stage 515. At this point, the server computer site 220*n* must verify whether the client computer 210, which has requested using the Site Name, has done so bypassing the load balancing or failover. If so, the client computer 210 is redirected to the proper Group Name for handling the request (or is redirected to the Pool Name, for an embodiment in which server groups are not defined), because the client computer 210 has bypassed load balancing or admission control load failover. The presence of the timestamp-dated marker placed into the URI in stage 515 indicates that load balancing has, already been engaged. Conversely, the absence or expiration of the timestamp-dated marker indicates that load balancing has been bypassed.

Specifically, at stage 515 server computer site 220*n* determines whether the current URI contains the expected marker and timestamp. If it does not, then operation 500 proceeds to terminate with a redirection to the proper Group Name at stage 545. Not all embodiments include the concept of server groups. In these cases, the Pool Name is used as the redirection target in stage 545. Conversely, if the current URI does contain the marker and timestamp, then operation 500 proceeds to stage 520 where an expiration check is applied to the timestamp. A short expiration time, such as 60 seconds, is chosen to defeat bookmarking or similar reuse at a later date of a redirection URI created at stage 535. In some embodiments, this may require close synchronization of clocks within the server computer pool. Otherwise, clock differences could overwhelm the short expiration time. If the timestamp has expired, then operation 500 proceeds to stage 545 and terminates with a redirection to the proper Group Name (or Pool Name if no server groups are defined for the embodiment).

If the timestamp marker is present and has not expired, the operation 500 may proceed to initiate the new session (e.g., set the new session ID into the HTTP/HTTPS response, thereby causing operation 500 to be bypassed on all subsequent requests for the session) and deliver the requested page. Alternatively, operation 500 may proceed to perform an admission control load overflow process in FIG. 5B.

Figure 5B:
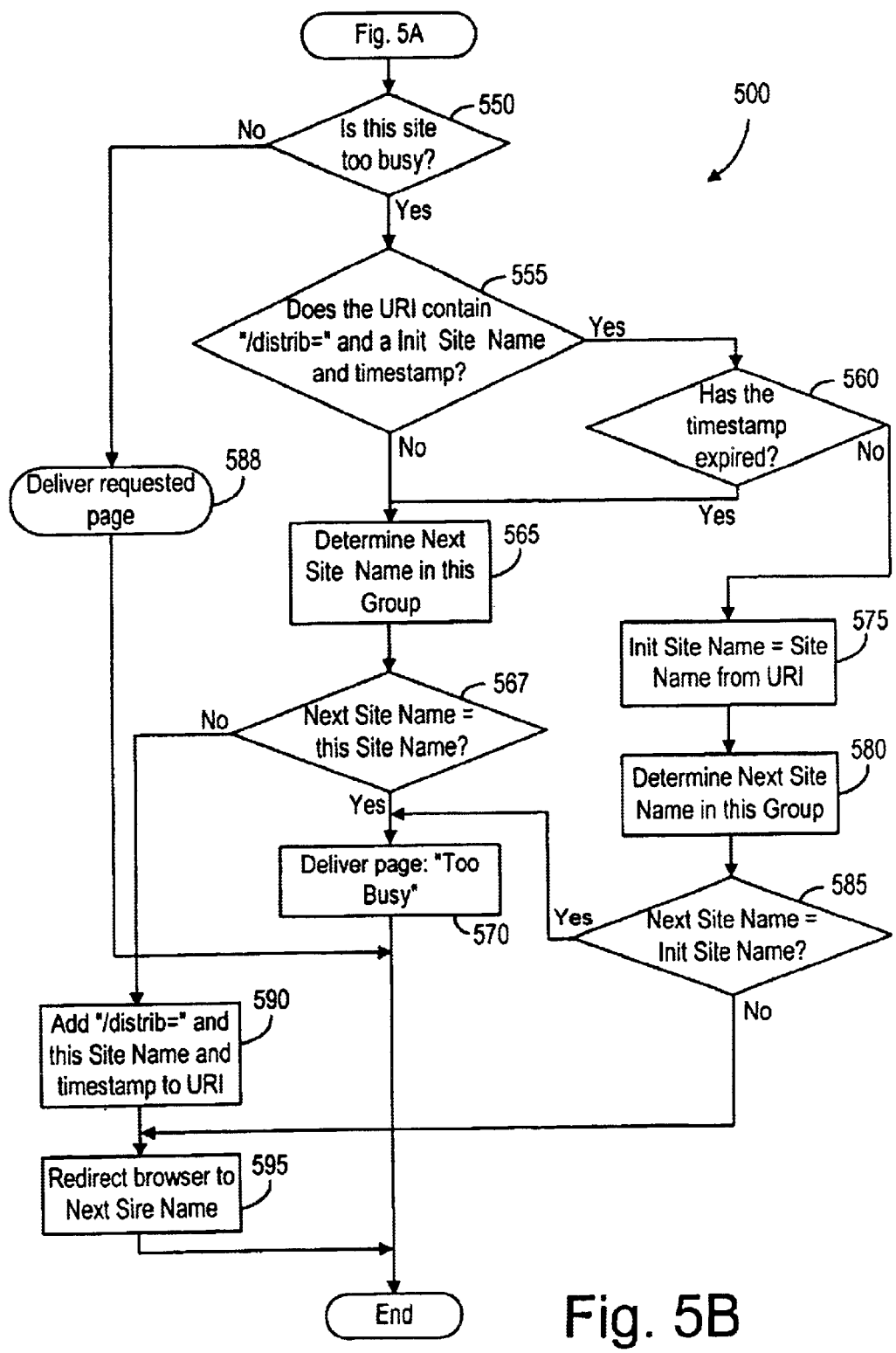

An admission control load overflow process is performed in FIG. 5B. The admission control load overflow process is described in U.S. Pat. No. 6,055,564 to Phaal, entitled "Admission control where priority indicator is used to discriminate between messages" and U.S. Pat. No. 6,006,269 to Phaal, entitled "Admission control system with messages admitted or deferred for re-submission at a later time on a priority basis" which are incorporated herein by reference in their entirety.

In FIG. 5B, stage 550 first determines whether the server site that received the HTTP/HTTPS request is too busy to handle such request. Various load calculation techniques known in the art can be used to make this determination. If the server site concludes to be too busy, operation 500 proceeds to stage 555. Otherwise, operation 500 proceeds to stage 588, where the new session is initiated (e.g., a session ID is set into the HTTP/HTTPS response, thereby causing operation 500 to be bypassed on all subsequent requests for the session) and the requested page is delivered to the requesting client computer 210. Then operation 500 terminates.

Stage 555, in contrast, is committed to terminate with either redirection to the next Site Name in the server group (or pool, if groups are not defined in the embodiment), or delivery of an error message to the 30 user indicating that all server sites are too busy to accept the request. First, stage 555 determines whether the URI contained in the HTTP/HTTPS request contains an expected marker (e.g., "/distrib=" in the additional path of the request URI) followed by both an Initial Site Name and a timestamp. The same marker as in stages 515 and 535 of FIG. 5A is used. However, in those stages there is no utilization of Initial Site Name. The marker with Initial Site Name and timestamp indicates at stage 555 (FIG. 5B) that admission control load overflow is already in process from a previous server computer site 220n. The Initial Site Name records the server computer site 220n at which the admission control load overflow began, and the timestamp records when it began (for purposes of dating the URI so as to defeat potential URI reuse later).

If both an Initial Site Name and timestamp are present in the URI at stage 555, operation 500 proceeds to stage 560. Otherwise, operation 500 proceeds to stage 565. Stage 560 determines whether the timestamp has expired (e.g., by comparing the timestamp value to a current time value and determining whether the time difference is within a predefined limit). As in stage 520 (FIG. 5A), a short expiration time is used, and in some embodiments close synchronization of clocks within the server pool is required. If the timestamp has expired, operation 500 proceeds to stage 565. Otherwise, operation 500 proceeds to stage 575.

If the URI contains the expected marker with an Initial Site Name and an unexpired timestamp, load overflow began on another server computer site 220n within the group (or pool, in those embodiments which do not implement server groups) and has continued to this server computer site 220n. The Initial Site Name is retrieved from the URI (stage 575). A new Site Name is then selected within the same group (or pool, for embodiments not implementing server groups) as the server computer site 220n receiving the HTTP/HTTPS request (stage 580). The selected new Site Name is the one for whichever server computer site 220n is circularly next within the group/pool. Stage 585 then determines whether the Next Site Name is the same as the Initial Site Name from the request URI. If so, that indicates that the admission control load overflow has cycled through and overflowed on all sites, which in turn means that all server computer sites are busy. In this case, operation 500 proceeds to stage 570. Otherwise, that indicates that there is at least one remaining server computer site which has not yet been attempted (identified by the Next Site Name), and so operation 500 proceeds to stage 595 where operation 500 is committed to terminate with subsequent admission control load overflow redirection.

In contrast, if the URI either does not contain the expected marker with an Initial Site Name and timestamp, or does contain these items albeit with an expired timestamp, then the need to embark on a new admission control load overflow cycle is indicated. A new Site Name within the same group (or pool, in those embodiments which do not implement server groups) as the server computer site 220n receiving the HTTP/HTTPS request is selected (stage 565). The selected new Site Name is the one for whichever server computer site 220n is circularly next within the group/pool. Stage 567 then determines whether the Next Site Name is the same as the Site Name for the server receiving the HTTP/HTTPS request (i.e., there are no other server computer sites 220n in the group/pool to begin with), in which case all servers sites are considered busy, so operation 500 proceeds to stage 570. Otherwise, operation 500 proceeds to stage 590 where operation 500 is committed to terminate with initial admission control load overflow redirection.

In stage 570, a web page indicating that all of the requested sites are too busy is returned to client computer 210. Alternatively, in stage 590, the overflow marker is created. The overflow marker contains the current server computer site 220n Site Name as the Initial Site Name, and the current time as the timestamp. Once created, the overflow marker is added to the URI received with the HTTP/HTTPS request, in the same manner as described with respect to stage 535 of FIG. 5A. At stage 595, the request URI (as modified in stage 590) is used as a target location URI, except that the current Site Name is replaced with the Next Site Name. The requesting web browser is then redirected to this target location URI (stage 595) and operation 500 terminates. Redirection is accomplished using such standard techniques as the HTTP/1.0 3xx protocol with the Location response header, or the HTML 2.0 META tag with the Refresh option. Note that when the next server computer site 220*n* begins executing operation 500 itself, starting with FIG. 5A, the presence of the Next Site Name in the Host header, and the presence of the marker with nonexpired timestamp in the URI, causes operation 500 to directly proceed from stage 510 (FIG. 5A), though stages 515 and 520, to stage 522. Hence load balancing is bypassed on all subsequent server computer sites 220*n* engaging in admission control load overflow, since load balancing was already performed.

Appendix A provides definitions and examples for some of the terms used in the Detailed Description section of the present application.

Appendix B is a pseudo code listing of a server computer program suitable for use in the present invention. This algorithm is implemented as a server-side component (for example, as a library routine or class used by a server API plugin, servlet, CGI or FastCGI program). The algorithm is executed by the server when an HTTP or HTTPS request for the stateful server is received, which does not correspond to an existing session. (For example, it lacks a session ID, or the session ID it contains is expired or invalid for whatever reason.) Conversely, the algorithm is bypassed for all other requests.

Embodiments described above illustrate but do not limit the invention. For example, the present invention is not limited to any specific order of the operations described in the flow diagrams. Numerous modifications and variations are possible in accordance to the principles of the present invention, as described by the following claims.

Appendix A

Site ::=One or more real Web server machine(s), hosting the server-stateful application in question, and sharing/replicating the session state among themsel(ves). Hence multiple Sites are independent of one another, in the sense that they each maintain state independently of one another. A Site may have multiple DNS names/aliases, virtual and/or physical IP addresses, and/or ports.

Example: An organization's Web servers in Boston and Geneva each host the same server-stateful application. This application does not share its server-side session state with other instances. Therefore the Boston Web server application is one Site, and the Geneva instance is another Site.

Example: The same organization as in the previous example has two Web servers in Chicago. Each hosts the same server-stateful applications in the previous example, but these application instances do share their server-side session state mutually. Therefore this Chicago Web farm is one Site.

Pool ::=The unordered set of all of the deployed Sites for the server-stateful application in question.

Example: Assume the Site examples (see above) constitute all of the Sites for that organization and server-stateful application. Therefore the Boston, Geneva, and Chicago Sites comprise a Pool.

Group ::=An ordered group of a Pool, containing all of the deployed Sites for the application in question which exclusively handle a particular client base. Note: If all client bases are handled non-exclusively by all Sites in a Pool, then the Group is the Pool.

Example: Assume the Site and Pool examples (see above). Assume further that the Geneva Site exclusively handles a European client base, while the Boston and Chicago Sites exclusively handle an Americas client base. Therefore there are two Groups in the Pool: a European Group consisting of Geneva, and an Americas Group consisting of Boston and Chicago.

Example: Assume the previous example, with the modification that the Chicago Site can handle either client base. Thus there are still two Groups in the Pool, but the membership is slightly different: the European Group consists of Geneva and Chicago, and the Americas Group consists of Boston and Chicago.

Example: Assume the Site and Pool examples (see above). But in contrast to the previous examples, assume that all Sites are capable of handling all client bases non-exclusively. Thus there is only one Group, and it is equivalent to the whole Pool: Boston, Geneva, and Chicago.

Note: For purposes of load overflow (see algorithm below), Sites are also ordered within a Group. Ordering has been intentionally overlooked in the previous examples.

DNS Failover Nameserver ::=Any DNS nameserver capable of resolving IP address for a DNS name as follows: Each DNS name corresponds to one or more IP addresses (physical or virtual), each for a different Site. When an IP address query for the DNS name is handled, the first IP address is consistently returned, so long as the server for that IP address is currently operational; if the server is non-operational, the second IP address is returned so long as that server is currently operational; etc. DNS time-to-live (TTL) is zero or near-zero seconds on all returns. No other special features are required.

Example: An example of a product capable of behaving as a DNS Failover Nameserver is the Cisco Distributed-Director 2500 series.

DNS Load Balance Nameserver ::=Any DNS nameserver capable of resolving IP address for a DNS name as follows: Each DNS name corresponds to one or more IP addresses (physical or virtual), each for a different Site. When an IP address query for the DNS name is handled, any one of the IP addresses corresponding to any of the currently-operational servers in any of the currently-operational Sites may be returned, taking into account any of various load-balancing algorithms (round-robin, random selection, least-busy, etc). DNS time-to-live (TTL) is zero or near-zero seconds on all returns. No other special features are required.

Example: An example of a product capable of behaving as a DNS Load Balance Nameserver is the Cisco DistribulatedDirector 2500 series.

Site Name ::=A unique DNS name for a Site. The Site Name is authoritatively configured in a DNS Failover Nameserver so as to primarily correspond with an IP address for the Site; to secondarily correspond with an IP address for the next Site in the Site's containing Group; etc.

Example: Assume the Site, Pool, and Group examples from above, where the Geneva Site comprises a European Group and the Boston and Chicago Sites comprise an Americas Group. The Geneva Site Name (eg, "geneva.app.com") would be authoritatively configured in a DNS Failover Nameserver with one IP address: that of the Geneva Site. The Boston Site Name (eg, "boston.app.com") would be authoritatively configured in a DNS Failover Nameserver with two IP addresses: one of the Boston Site for primary usage, and one of the Chicago site for backup usage. The Chicago Site Name (egg "chicago.app.com") would be similarly configured, but vice-versa.

Pool Name ::=A unique DNS name for a Pool. The Pool Name is authoritatively configured in a DNS Load Balance Nameserver so as to correspond with all the IP addresses for all Sites in the Pool (one IP address for each Site).

Example: Assume the Site and Pool examples from above. Then the Pool Name for the Web application (eg, "app.com") would contain one IP address for the Geneva Site, one for the Boston Site, and one for the Chicago Site.

Group Name ::=A unique DNS name for a Group. The Group Name is authoritatively configured in a DNS Load Balance Nameserver so as to correspond with all the IP addresses for all Sites in the Group (one IP address for each Site). In the case where the Group is the Pool, then the Group Name is the same as the Pool Name.

Example: Assume the Site, Pool, and Group examples from above, where the Geneva Site comprises a European Group and the Boston and Chicago Sites comprise an Americas Group. The Group Name for the European Group (eg, "europe.app.com") would contain one IP address for the Geneva Site. The Group Name for the Americas Group (eg, "americas.app.com") would contain one IP address for the Boston Site, and one for the Chicago Site.

APPENDIX B

```
Scheme = This request's protocol, HTTP or HTTPS
Relative URI = This request's server-relative URI, not
including query string
Query = This request's form arguments, if any
/* STEP 1: "Load Distribution (Load Balancing and
Lockdown)"
/
/  First, ensure the client is aware of, and is using,
/  the failover-enabled Site Name for this Site. This
/  step sets up the client for failover via the Site
/  Name and the DNS Failover Nameserver should this
/  Site fail. It also resets the client from using the
/  Group Name or Pool Name and the DNS Load Balance
/  Nameserver for future requests in the session,
/  thereby achieving a persistent session (barring
/  failure of this Site).  */
IF  HTTP/1.1 "Host" header exists in this request AND
    HTTP/1.1 "Host" request header IS NOT this Site
Name {
/* Client is using a non-failover-enabled name for
this Site - we must correct this by HTTP redirecting
the browser to a proper name */
IF HTTP/1.1 "Host" request header IS the Pool Name {
    /* Client is using the load-balancing Pool Name
    for this Site */
    /* Proper group may be judged by application-
    defined heuristics, discussion of which is not in
    scope for this algorithm */
    Proper Group = Determine proper Group for this
    request
    IF Proper Group IS this Group {
      /* Client came to the right Group - HTTP
      redirect to this site's failover-enabled Site
      Name - include "/Distrib=" followed by
      current GMT time to avoid redistribution to
      Pool on the target site */
      DELETE any pre-existing "/Distrib=" and
      Timestamp and Initial Site from Relative URI
      HTTP 302 Redirect to: Scheme://Site
      Name/Relative URI/Distrib=Current
      Timestamp?Query
      STOP
    }
    ELSE {
      /* Client came to the wrong Group - HTTP
      redirect to proper Group Name */
      Group Name = The Group Name for the Proper
      Group
      HTTP 302 Redirect to: Scheme://Group
      Name/Relative URI?Query
      STOP
```

APPENDIX B-continued

```
    }
}
ELSE {
    /* Client is using some other name, eg, a Group
    Name, another Site Name which has failed-over to
    this Site, some other non-standard name for this
    Site, etc - HTTP redirect to this site's failover-
    enabled Site Name - include "/Distrib=" followed
    by current GMT time to avoid redistribution to
    Pool on the target site */
    DELETE any pre-existing "/Distrib=" and Timestamp
    and Initial Site from Relative URI
    HTTP 302 Redirect to: Scheme://Site Name/Relative
    URI/Distrib=Current Timestamp?Query
    STOP
    }
}
/* STEP 2: "Load Redistribution"
/
/ Second, redistribute to the proper Group any request
/ to start a new session made directly under the Site
/ Name. This step handles those requests for new
/ sessions which arrive directly via the Site Name,
/ having bypassed load balancing via the Group or Pool
/ Names, by forcing them back through the proper Group
/ Name for load balancing. */
IF Relative URI DOES NOT CONTAIN (/Distrib= AND Some
   Timestamp) OR (Relative URI CONTAINS (/Distrib= AND
   Some Timestamp) AND Some Timestamp has expired)
   { /* Must be short expiration, eg, 60 sec */
     /* The request for a new session does not contain
     any indicator of having gone through load
     balancing recently - so this request is an attempt
     to access the Site directly without first going
     through load balancing. Redirect to a load-
     balancing-enabled Group Name. */
     /* Proper group may be judged by application-
     defined heuristics, discussion of which is not in
     scope for this algorithm */
     Proper Group = Determine proper Group for this
     request
     Group Name  = The Group Name for the Proper Group
     HTTP 302 Redirect to: Scheme://Group Name/Relative
   URI?Query
     STOP
}
/* STEP 3: "Load Overflow"
/
/ Third, load-overflow to the next Site in the Group
/ if this Site is too busy to start a new session now.
/ This step is unnecessary if the DNS Load Balance
/ Nameserver does least-busy distribution; conversely,
/ this step may be desirable if the DNS Load Balance
/ Nameserver does only simple distribution (eg, round
/ -robin) without a sense of current free capacity at
/ each Site. If this step is not desired, it may be
/ omitted from the algorithm. */
IF Site is too busy              { /* Server capacity may be judged
  by application-defined
  heuristics, discussion of which
  is not in scope for this
  algorithm */
    /* The Site has judged itself too busy to accept
    this new session - HTTP redirect to the next Site
    in the Group, or issue reject HTML if all Sites
    have been attempted */
    IF Relative URI DOES NOT CONTAIN (/Distrib= AND
      Initial Site AND Some Timestamp) OR (Relative
      URI CONTAINS (/Distrib= AND Initial Site AND
      Some Timestamp) AND Some Timestamp has expired)
      { /* Short expiration, eg, 60 sec */
      /* This is the first Site in the Group which
      has begun load overflow */
      Next Site = The ordinally-next Site in the
      Group after this one, with wraparound
      IF Next Site IS this Site { /* This is the
                                   only Site */
         HTTP 200 Document found:
           Return HTML re: "All Sites Busy"
```

APPENDIX B-continued

```
        STOP
    }
    ELSE {
        /* This is not the only Site */
        DELETE pre-existing "/Distrib=" and Initial
        Site and Timestamp from Relative URI
        HTTP 302 Redirect to: Scheme://Next Site
        Name/Relative URI/Distrib=This Site +
        Current Timestamp?Query
        STOP
    }
}
ELSE {
    /* Some other Site in the Group began load
    overflow to this Site */
    Initial Site = From the Relative URI
    Next Site = The ordinally-next Site in the Group
    after this one, with wraparound
    IF Next Site IS Initial Site {
        /* All Sites have been attempted */
        HTTP 200 Document found:
            Return HTML re: "All Sites Busy"
        STOP
    }
    ELSE {
        /* Site(s) remain to be attempted */
        HTTP 302 Redirect to: Scheme://Next Site
        Name/Relative URI?Query
        STOP
    }
  }
}
/* Done. Return from this component and resume
/ handling the request. For example, create the new
/ session, generate the HTML response to return, etc.
*/
```

What is claimed is:

1. A computer system comprising:

a computer network;

one or more client computers connected to the computer network;

a plurality of server computers connected to the computer network;

a plurality of server computer programs executable by the plurality of server computers, wherein one or more of the server computer programs comprise computer instructions for:

determining whether one of the client computers has previously maintained a session with one of the server computers;

extracting a host name from the first communication request not in session;

determining whether the host name extracted from the first communication request not in session is a Site Name for the server, a Site Name for another server, a Group Name, or a Pool Name;

redirecting the request to the Site Name for the server when the extracted host name is a Group Name or other server Site Name;

redirecting the request to the Site Name for the server when the extracted host name is a Pool Name and the server is in the proper group;

performing both the above redirections such that a flag is introduced;

redirecting the request to the proper Group Name when the extracted host name is a Pool Name and the server is in an improper group; and redirecting the request to the proper Group Name when the extracted host name is the Site Name for the server and the flag has not been introduced.

2. The computer system of claim 1, wherein the server computer program further comprises computer instructions for:

if the extracted host name is the Site Name for the server and the flag has been introduced, initiating a new session for the client computer with the server computer and delivering a page to the client computer from the server computer.

3. The computer system of claim 2, wherein the server computer program further comprises instructions for selecting a Group Name based on properties of the request.

4. The computer system of claim 2, wherein the server computer program further comprises instructions for performing admission control load overflow.

5. The computer system of claim 1, wherein the computer network is the Internet.

6. A method for distributing load among a plurality of server computers connected to one of more client computers via a computer network, the method comprising:

determining whether one of the client computers has previously maintained a session with one of the server computers;

extracting a host name from the first communication request not in session;

determining whether the host name extracted from the first communication request not in session is a Site Name for the server, a Site Name for another server, a Group Name, or a Pool Name;

redirecting the request to the Site Name for the server when the extracted host name is a Group Name or other server Site Name;

redirecting the request to the Site Name for the server when the extracted host name is a Pool Name and the server is in the proper group;

performing both the above redirections such that a flag is introduced;

redirecting the request to the proper Group Name when the extracted host name is a Pool Name and the server is in an improper group; and redirecting the request to the proper Group Name when the extracted host name is the Site Name for the server and the flag has not been introduced.

7. The method of claim 6, further comprising:

if the extracted host name is the Site Name for the server and the flag has been introduced, initiating a new session for the client computer with the server computer and delivering a page to the client from the server computer.

8. The method of claim 7, further comprising selecting a Group Name based on properties of the request.

9. The method of claim 7, further comprising performing admission control load overflow.

10. The method of claim 6, wherein the computer network is the Internet.

11. A computer-readable storage medium comprising a server computer program executable by at least one of a plurality of server computers connected to one or more client computers over a computer network, the server computer program comprising computer instructions for:

determining whether one of the client computers has previously maintained a session with one of the server computers;

extracting a host name from the first communication request not in session;

determining whether the host name extracted from the first communication request not in session is a Site Name for the server, a Site Name for another server, a Group Name, or a Pool Name;

redirecting the request to the Site Name for the server when the extracted host name is a Group Name or other server Site Name;

redirecting the request to the Site Name for the server when the extracted host name is a Pool Name and the server is in the proper group;

performing both the above redirections such that a flag is introduced;

redirecting the request to the proper Group Name when the extracted host name is a Pool Name and the server in an improper group; and redirecting the request to the proper Group Name when the extracted host name is the Site Name for the server and the flag has not been introduced.

12. The computer-readable storage medium of claim 11, wherein the server computer program further comprises computer instructions for:

if the extracted host name is the Site Name for the server and the flag has been introduced, initiating a new session for the client computer with the server computer and delivering a page to the client computer from the server computer.

* * * * *